Oct. 7, 1947.  A. J. TIMONEY  2,428,399
PHOTOGRAPHIC APPARATUS
Filed Aug. 2, 1944
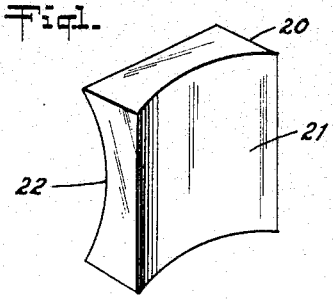
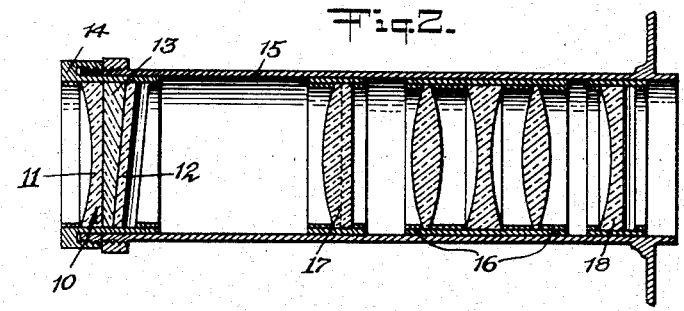
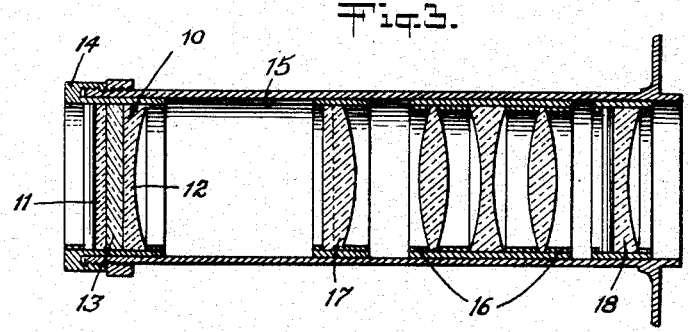
INVENTOR.
Andrew J. Timoney Patented Oct. 7, 1947

2,428,399

UNITED STATES PATENT OFFICE 2,428,399

PHOTOGRAPHIC APPARATUS

Andrew J. Timoney, Flushing, N. Y., assignor of one-third to Frank G. Kirby and one-third to William Bach, both of Elmhurst, one-tenth to James Timoney and one-tenth to Mrs. Ruth Cormack, both of Bronx, and one-tenth to Mrs. Martha Burgin, Flushing, N. Y.

Application August 2, 1944, Serial No. 547,662

4 Claims. (Cl. 88—57)

This application is a continuation in part of my application, Serial No. 420,278, filed November 24, 1941.

The invention relates to an improved lens system for cameras.

The primary object of the invention is to provide a camera lens system for still or motion picture cameras with which distant as well as nearby objects and, in the case of motion picture cameras or television apparatus, objects moving toward or away from the camera may be satisfactorily photographed without adjusting or changing the focus of the camera. This is not possible with a conventional camera lens system, particularly within distances of 100 feet.

Another object is the provision of a new combination of lenses which renders my lens system possible.

The camera lens system herein described has been tested by disinterested experts in the motion picture industry and found to possess the characteristics, and to measure up to the claims, made for it.

A preferred embodiment of the invention is shown in the accompanying drawing in which—

Fig. 1 is a perspective view of a minus cross cylindrical lens and shows the manner in which these lenses are ground;

Fig. 2 is a longitudinal section of my camera lens system incorporating a new combination having a pair of negative cylindrical lenses with their axes at right angles to each other and a prism interposed between them positioned ahead of the conventional motion picture lens system with a positive cross cylindrical lens between the negative cross cylindrical lens and the lens system and also another pair of negative cross cylindrical lenses positioned behind the camera lens;

Fig. 3 is a longitudinal view of the same camera lens system shown in Fig. 2, taken on a plane which is perpendicular to the plane of the section shown in Fig. 2.

The composite lens 10 shown in Figs. 2 and 3 comprises a pair of negative cylindrical lenses 11 and 12 having their axes at right angles to each other and a prism 13 interposed between said lenses. As shown in the drawings this composite lens consists of three separate lenses cemented together. It may, however, be ground in one piece, then constituting a negative cross cylindrical lens having faces in planes at a slight angle to each other to produce the effect of a prism. If desired the prism may be eliminated and the composite lens consist merely of a negative cross cylindrical lens. Insertion of the prism however gives greater flexibility in directing light to the film. Said composite lens may be mounted in an adjustable cap ring 14 wihch may be rotated on the front end of the cylindrical casing or lens barrel 15 so that the path of the light passing through the prism may be varied. At the inner end of the lens barrel 15 a standard camera lens unit 16 is mounted. In front of this lens unit is a positive cross cylindrical lens 17 and behind it a negative cross cylindrical lens 18. If desired the negative cross cylindrical lens may be positioned ahead of the camera lens unit 16. However, better results have been secured with it positioned as shown.

In Fig. 1 a minus cross cylindrical lens 20 is shown. It will be noted that one side of the lens has a minus face 21 ground on one axis while the face 22 on the other side of the lens is ground on an axis at right angles to that of the face 21.

I claim:

1. A camera lens system comprising, in combination, a composite lens, a positive cross cylindrical lens positioned behind said composite lens, a standard lens unit positioned behind said positive cross cylindrical lens, and a negative cross cylindrical lens positioned behind said standard lens unit, said composite lens consisting of a pair of negative cylindrical lenses having their axes at right angles to each other, and a prism interposed between said lenses.

2. In a camera lens system having a camera lens unit, a minus cross cylindrical lens positioned on each side of the camera lens unit and a plus cross cylindrical lens positioned in front of the camera lens unit behind the minus cross cylindrical lens on that side, both sides of said positive and negative cross cylindrical lenses being of equal focal length.

3. A camera lens system having a camera lens unit, a pair of negative cylindrical lenses having their axes at right angles to each other, a prism interposed between said lenses, a negative cross cylindrical lens, and a positive cross cylindrical lens between said negative cross cylindrical lens and the first-mentioned lenses.

4. In combination with a camera lens unit, a lens system comprising a pair of negative cross cylindrical lenses, one on each side of said camera lens unit, and a positive cross cylindrical lens between one of said cross cylindrical lenses and said camera lens unit, both sides of each of said cross cylindrical lenses being of equal focal length.

ANDREW J. TIMONEY.

REFERENCES CITED

The following references are of record in the file of this patent:

UNITED STATES PATENTS

| Number | Name | Date |
|---|---|---|
| 2,036,622 | Emmerich | Apr. 7, 1936 |
| 1,636,450 | Ames | July 19, 1927 |
| 1,938,808 | Ceccarini | Dec. 12, 1933 |
| 801,935 | Trapp | Oct. 17, 1905 |
| 1,692,973 | Babcock | Nov. 27, 1928 |

FOREIGN PATENTS

| Number | Country | Date |
|---|---|---|
| 8,512 | Great Britain | 1898 |
| 416,074 | Great Britain | Sept. 10, 1934 |